United States Patent [19]

Huey et al.

[11] Patent Number: 5,108,034
[45] Date of Patent: Apr. 28, 1992

[54] SPRAY HEADER AND NOZZLE ASSEMBLY

[75] Inventors: Andrew M. Huey, Lake Jackson, Tex.; Arthur R. Shirley, Jr., Florence, Ala.

[73] Assignee: The Dow Chemical Company, Midland, Mich.

[21] Appl. No.: 233,932

[22] Filed: Aug. 15, 1988

Related U.S. Application Data

[63] Continuation of Ser. No. 5,505, Jan. 20, 1987, abandoned.

[51] Int. Cl.⁵ .............................. B05B 1/24; B05B 1/28
[52] U.S. Cl. ...................................... 239/13; 239/139; 239/288; 239/550; 239/568; 425/10; 264/5
[58] Field of Search ............... 239/132, 128, 139, 135, 239/132.1, 13, 548, 550, 551, 600, 288, 568; 118/303, 19, 313, 24; 222/146.2, 146.4; 425/10; 264/37, 5

[56] References Cited

U.S. PATENT DOCUMENTS

| | | | |
|---|---|---|---|
| 1,033,416 | 7/1912 | Van Horn | 239/550 X |
| 2,559,527 | 7/1951 | Williams | 239/28330507 |
| 2,657,092 | 10/1953 | Jones | 239/551 |
| 2,898,625 | 8/1959 | Chao | 18/2.7 |
| 2,955,807 | 10/1960 | Riley et al. | 257/300 |
| 3,084,914 | 4/1963 | Davis | 165/61 |
| 3,231,413 | 1/1966 | Berquin | 117/100 |
| 3,234,307 | 2/1966 | Tuttle | |
| 3,255,036 | 6/1966 | Kramer et al. | 117/100 |
| 3,556,403 | 1/1971 | Manginell | 239/139 X |
| 3,579,721 | 5/1971 | Kaltenbach | 18/2.7 |
| 3,711,254 | 1/1973 | McGowan et al. | 23/313 |
| 3,867,410 | 2/1975 | Brand et al. | 260/346.4 |
| 3,869,479 | 3/1975 | Barth et al. | 260/346.4 |
| 3,877,415 | 4/1975 | Blouin | 118/303 |
| 3,991,225 | 11/1976 | Blouin | 427/3 |
| 4,002,198 | 1/1977 | Wagner et al. | 165/61 |
| 4,133,290 | 1/1979 | Melliger | 118/303 X |
| 4,190,622 | 2/1980 | Landis | 264/14 |
| 4,213,924 | 7/1980 | Shirley, Jr. | 264/7 |
| 4,252,772 | 2/1981 | Way | 422/244 |
| 4,272,234 | 6/1981 | Tse | 118/19 X |
| 4,353,852 | 10/1982 | Tse | 264/37 |
| 4,424,176 | 1/1984 | Shirley, Jr. et al. | 264/7 |
| 4,440,866 | 4/1984 | Lunghofer et al. | 501/127 |
| 4,506,453 | 3/1985 | Shirley, Jr. et al. | 34/12 |
| 4,507,335 | 3/1985 | Mathur | 118/303 X |
| 4,706,889 | 11/1987 | Hofmann | 239/550 |

FOREIGN PATENT DOCUMENTS 3024292 6/1980 Fed. Rep. of Germany .

Primary Examiner—Andres Kashnikow
Assistant Examiner—Kevin Weldon

[57] ABSTRACT

A spray header and nozzle assembly which includes a first elongated tubular member and a second elongated tubular member of a smaller diameter than the first tubular member coaxially disposed within the first tubular member to form an annular space between the first and second tubular members and a plurality of spray nozzle assemblies in fluid communication with the inside of the second tubular member. The spray nozzle assemblies are perpendicularly disposed to the axis of both tubular members and recessed into the annular space. Also, the nozzle assemblies include a first tube extending a predetermined distance beyond the circumference of the first tubular member and a second tube of a smaller diameter than the first tube coaxially disposed within the first tube and recessed into the first tube.

4 Claims, 3 Drawing Sheets

SPRAY HEADER AND NOZZLE ASSEMBLY

This is a continuation of application Ser. No. 005,505 filed Jan. 20, 1987, now abandoned.

BACKGROUND OF THE INVENTION

This invention relates to a spray header and nozzle assembly useful, for example, in drum granulation apparatuses.

Granulation drums, such as those described in U.S. Pat. Nos. 3,877,415 and 3,991,225 issued to Bloulin are used in various industrial processes such as for the production of urea. Granulation of urea using the rotary drum granulation process is also described in U.S. Pat. Nos. 4,213,924; 4,424,176 and 4,506,453.

In the drum granulation process a spray header and nozzle assembly is used to spray molten product onto a falling curtain of small seed particles and undersize recycle granules to increase the particle size by successive coats of molten material. A recurring problem with the use of the prior art spray headers and nozzles has been with plugging of the nozzle orifice because the molten product solidifies before it is ejected from the nozzle. It is important to maintain the product in a molten state until it is ejected from the nozzle and onto the falling curtain to avoid the plugging of the nozzle orifices.

Heretofore, spray headers had nozzles extending out from the spray header. Oftentimes dust particles of material being sprayed would contact the nozzle extensions and melt on the surface thereof and, when cooled, would solidify and plug the nozzles. In addition, the extended nozzles were cooled by air currents inside the drum thereby freezing molten material inside the nozzle.

It is therefore, desired to provide a spray header and nozzle assembly that substantially eliminates the plugging problems of the prior art spray devices.

SUMMARY OF THE INVENTION

The present invention is directed to a spray header and nozzle assembly which includes a first elongated tubular member and a second elongated tubular member of a smaller diameter than the first tubular member coaxially disposed within the first tubular member to form an annular space between the first and second tubular members and a plurality of spray nozzle assemblies in fluid communication with the inside of the second tubular member. The spray nozzle assemblies are perpendicularly disposed to the axis of both tubular members and the nozzle assemblies include a first tube extending a predetermined distance beyond the circumference of the first tubular member and a second tube of a smaller diameter than the first tube coaxially disposed within the first tube and recessed into the first tube.

DETAILED DESCRIPTION OF THE PREFERRED EMBODIMENTS

Figure 1:
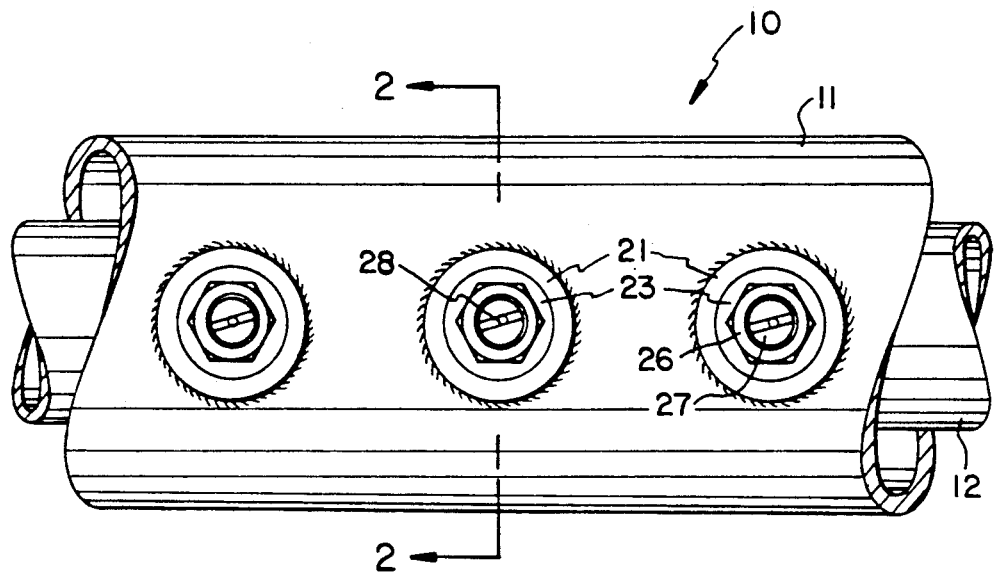
FIG. 1 is a front view showing the spray header and nozzle assembly of the present invention.
Figure 2:
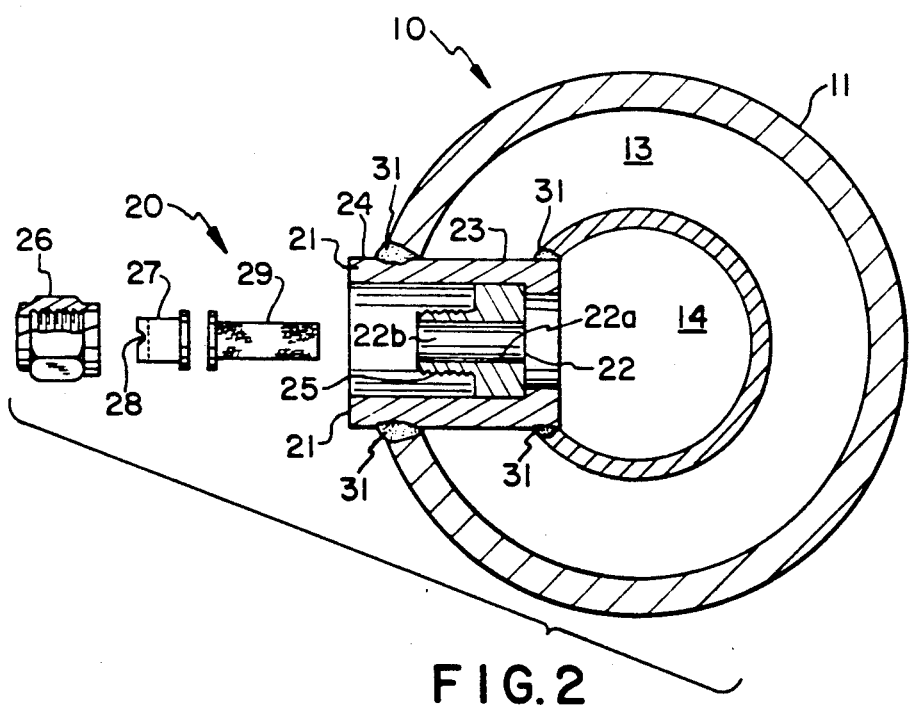
FIG. 2 a cross-section view and partially exploded view of FIG. 1 taken along line 2—2.

With reference to FIGS. 1 and 2, there is shown a header and spray nozzle assembly, indicated generally by numeral 10, including a first tubular member 11 and a second tubular member 12 coaxially disposed within the first tubular member 11 creating an annular space 13 for providing a heating fluid. The heating fluid in this instance is steam but other fluids such as hot oil can be used. The space 14 of the second tubular member 12 is provided for feeding molten material to the nozzle assemblies generally designated as numeral 20.

The nozzle assemblies 20 are disposed perpendicular to the axis of the tubular members 11 and 12. The nozzle assemblies 20 comprises a first tube member 21 and a second tube member 22 of a smaller diameter than the first tube member 21 and coaxially disposed within the tube member 21. The nozzle assemblies provide for the second tube 22 to be recessed a predetermined distance into the first tube 21. Generally, the length of tube 22 is approximately equal to the distance of the space 13 when viewed in cross section. Tube 22 has an annular flange portion 23 contacting the inner surface of tube 21. The inlet 22a and outlet 22b of tube 22 is in fluid communication with the inside space 14 of tubular member 12 and the outside environment of tubular member 21. However, the outlet 22b of tube 22 extends only to a predetermined distance inside the tube 21. The tube 21 extends from the tubular member 12 to a predetermined distance from the outside surface of tubular member 11 forming a curved shoulder portion 24. The curved shoulder portion 24 advantageously allows any dust particles collected on the surface of the shoulder to melt and drip off the shoulder portion without falling inside the tube 21 and plugging the outlet 22b of tube 22. A threaded portion 25 of the second tube allows for fitting a first cap 26 containing an opening 30. The cap 26 is adapted for holding a second cap 27 containing a slotted opening 28 and a screen 29. The screen is adapted for screening away foreign material which might plug the openings 28 and 30. The cap 26 is threaded inside for mating with the threaded portion 25.

The nozzle assemblies 20 can be mounted to tubular member 11 and 12 by any conventional means such as welding at points 31.

The process of the present invention will be described herein with reference to the production of bisphenols using a drum granulation process, but it is understood that the invention is not limited thereto. The process and assembly can be used in any process where spraying a molten material is required. Preferably, the spray header and nozzle assembly is used in a drum granulator used in the process for producing granular bisphenols as described in U.S. patent application Ser. No. 005,504 entitled "Production of Granular Bisphenols", filed of even date herewith, under the names of Kenneth T. McDonald and Arthur R. Shirley, incorporated herein by reference.

Normally bisphenol is a solid or semisolid at ambient temperatures but can be reduced to a sprayable liquid state by melting and can be returned to the solid or semisolid state by cooling below the melt temperature. In a melt granulation process such as described in U.S. patent application Ser. No. 005,504 bisphenol granules of the required size are grown by spraying molten bisphenol directly onto seed material. Seed particles of bisphenols produced by any conventional seed generating system are fed into a rotary granulation drum and then the bisphenol melt is fed into the rotary granulation drum and onto the seed particles using the nozzle assembly of the present invention.

Granulation occurs in the rotary drum. The rotary drum used in the present invention can be of the type described in U.S. Pat. Nos. 3,877,415; 3,991,225; 4,213,924; 4,424,176 and 4,506,453. The preferred process for producing bisphenol granules includes feeding a seed material of bisphenol into a rotary granulation drum enclosed in a gastight housing and spraying molten bisphenols onto the seed material in the presence of an inert gaseous atmosphere such as nitrogen.

Generally, the rotary drum is equipped with longitudinal lifting vanes, or flights, preferably equally spaced on the drum's inside shell and specially designed to form continuous longitudinal curtains of falling solid particles as the drum rotates. The shower of falling solid particles formed by the movement of the lifting flights fall on a deflector pan or pans for providing a curtain of falling granules on which the molten material can be sprayed by the spray header and nozzle assembly of the present invention.

Preferably, recycled undersize granules produced in the granulation present process are mixed with the seed particles, and then the mixture is fed into the granulation drum as seed material to form a bed of material in the drum. The mixing of the undersize granules and the seed particles can be carried out in a conventional feed hopper with a metering means for controlling the feed such as a weigh feeder.

As the drum rotates, the seed particles and recycle undersize granules are elevated from the bed by the lifting flights and dropped onto, preferably, two inclined collecting pans installed in a step fashion. Granules flowing from the top pan onto the bottom pan form an upper curtain and granules flowing from the bottom pan form a dense bottom curtain. Molten bisphenol is preferably sprayed on the lower curtain of the falling granules. The rate of bisphenol melt depends on the size of the drum and the desired capacity of the process.

The spraying of molten bisphenol onto the falling granules is carried out using a plurality of spray nozzle assemblies supported in a header assembly as described in the present invention. The spray pattern is linear with each nozzle rotated slightly off the horizontal to avoid overlapping spray streams. The spray produced by the nozzles of the present invention is a finely atomized spray wherein the droplets of molten bisphenol are atomized finely enough such that the formation of agglomerates in the granulation drum is minimized. The nozzles used to form the finely atomized spray are pressure-atomizing nozzles, i.e., nozzles in which the liquid is propelled by its own pressure through a small orifice at such high velocity that the stream is broken down into small droplets. The finely atomized bisphenol melt forms a thin layer on the falling granules and quickly solidifies on the relatively cool surface. Product granules of the desired sized are formed by successive layering of the melt on the granules as they pass through the rotary drum.

Figure 3:
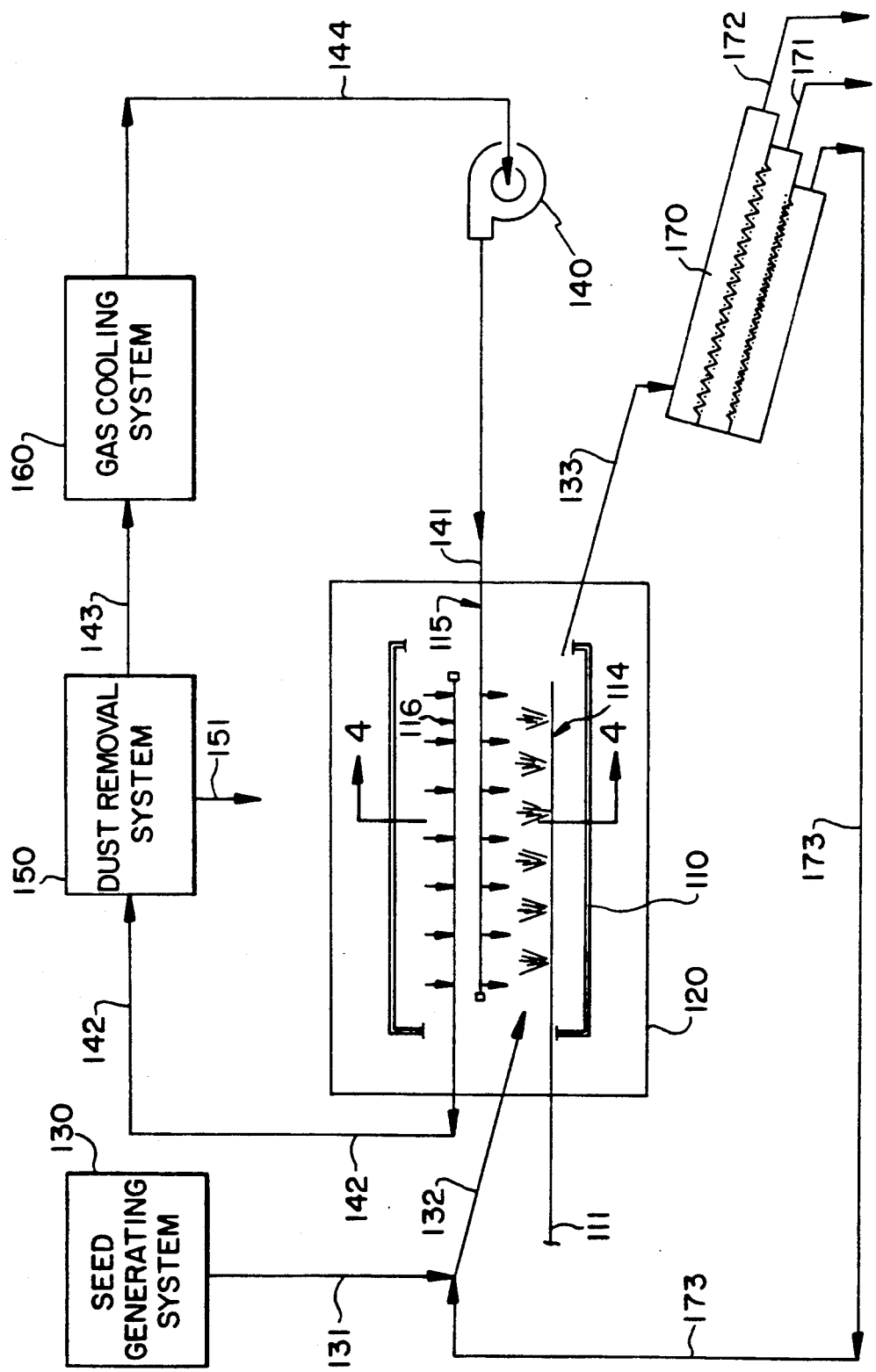
FIG. 3 is a schematic flow diagram showing the granulation process of the present invention.

In FIG. 3, there is shown one embodiment of the process of the present invention for melt granulation of bisphenols fed into a rotary granulation drum 110 through feed stream 141. Granulation occurs in the rotary drum 110 enclosed in a gastight enclosure 120 for operating the drum in a gaseous inert atmosphere. The enclosed unit can be advantageously run at a slight vacuum to avoid dust blowing out of the enclosure 120 and into the atmosphere and polluting the environment.

Figure 4:
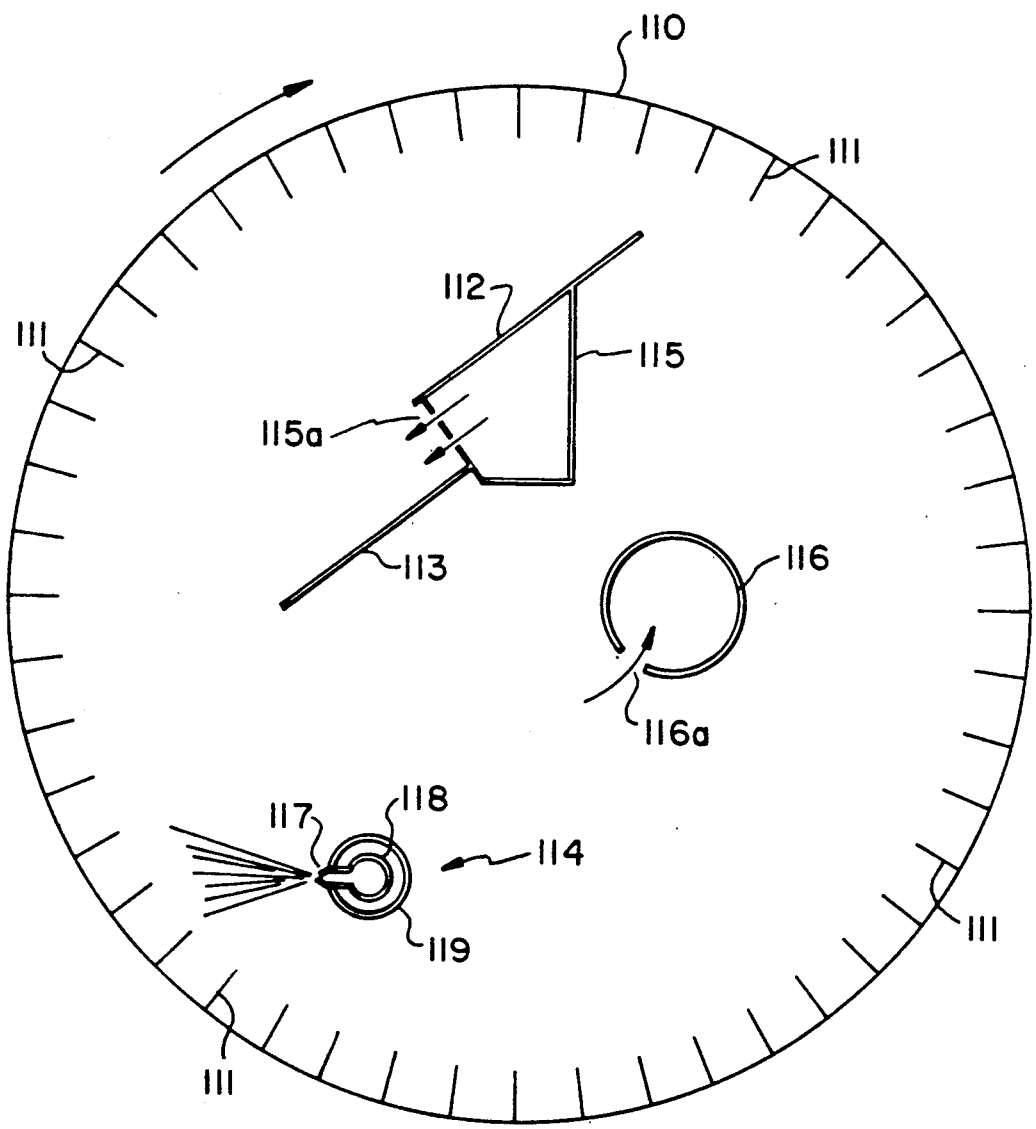
FIG. 4 is a cross-section of the granulation drum in FIG. 3 taken along the line 4—4.

The drum 110 of the present invention is more clearly shown in FIG. 4.

With reference to FIG. 4, the rotary drum of the present invention contains specially designed internal equipment including lifting vanes or flights 111, collecting or deflector pans 112 and 113, spray header and nozzle assembly 114, gas distributors 115 and gas collection header pipes 116, as herein described. Generally, in the rotary drum 110 the longitudinal lifting vanes, or flights 111, preferably are equally spaced on the drum's inside shell and specially designed to form continuous longitudinal curtains of falling solid particles. The shower of falling solid particles formed by the movement of the lifting flights 111 fall on the deflector pan or pans 112 and 113 for providing a curtain of falling granules on which the molten material can be sprayed with the spray header and nozzle assembly 114.

Seed particles of bisphenols produced by any conventional seed generating system 130 are fed into the drum granulator 110. The seed particles can be produced using conventional crushing or milling equipment. A suitable and preferred seed generator means 130 used in the present system is described in U.S. patent application Ser. No. 005,507, filed Jan. 20, 1987, now U.S. Pat. No. 4,793,783, entitled "Apparatus for Producing Prills", filed under the names of Andrew Michael Huey, Arthur Ray Shirley, Jr. and Phillip Alan Forsythe, and its Divisional U.S. patent application Ser. No. 290,716, filed Dec. 23, 1988, now U.S. Pat. No. 4,935,173, entitled "Process and Apparatus for Producing Prills", both incorporated herein by reference.

Preferably, recycled undersize granules produced in the present process, shown in FIG. 3 as stream 173 are mixed with the seed particles, shown as stream 131, and then the mixture in stream 132 is fed into the granulation drum 110 as seed material to form a bed of material in the drum. The mixing of the undersize granules and the seed particles can be carried out in a conventional feed hopper with a metering means for controlling the feed such as a weight feeder (not shown).

As the drum 110 rotates, the seed particles and recycle undersize granules are elevated from the bed by the lifting flights 111 and dropped onto the two inclined collecting pans 112 and 113 installed in a step fashion. The rotational speed of the drum is preferably from about 5 rpm (revolutions per minute) to about 18 rpm. Granules flowing from the top pan 112 onto the bottom pan 113 form an upper curtain and granules flowing from the bottom pan 113 into the flights 111 form a dense bottom curtain. Molten bisphenol is preferably sprayed on the lower curtain of the falling granules.

The preferred operating temperature of the undersized beads in the granulator is from about 70° to about 138° C. and more preferably, from about 123° C. to about 130° C. At temperatures lower than 70° C., an undesirable quantity of small beads, i.e., beads ranging from 200 to 400 micron size are produced. As the temperature of the beads increases, the production of small beads decreases and some of the seed particles agglomerate. The surface of these beads may be dull. At above 138° C. a tacky dust is formed and within a few minutes, the dust forms undesirable large balls ranging from 1-1¼ inch in diameter.

The bisphenol hot melt feed rate of the process is dependent on the desired capacity, for example, a capacity of 5000 pounds per hour of melt feed can be used.

The hot melt temperature is preferably from about 156° C. to about 180° C. and more preferably from about 158° C. to about 165° C. The hot melt temperature is maintained at from about 2° C. to about 10° C. above melting of the bisphenol.

Spraying of molten bisphenols onto the falling granules is carried out using a plurality of spray nozzles 117 and tube members 118 and 119 supported in the header assembly 114. Any spray header system with a plurality of spray nozzles can be used in the present process to spray molten bisphenols onto the seed material fed into the drum granulator 110. For example, a pipe or tube with nozzles attached along its length can be used for feeding liquid bisphenols to the drum and onto the seed material.

Preferably, a steam jacketed spray header and nozzle assembly 114 is used to maintain the temperature of the melt. The spray pressure used is from about 50 psig to about 200 psig. The spray pattern is linear with each nozzle rotated slightly off the horizontal to avoid overlapping spray streams. Preferably, the spray nozzles each have inlet screens for minimizing nozzle plugging.

The droplets of molten bisphenols should be atomized finely enough that the formation of agglomerates in the granulation drum is minimized. The formation of a finely atomized spray is preferably carried out by use of pressure-atomizing nozzles, i.e., nozzles in which the liquid is propelled by its own pressure through a small orifice at such high velocity that the stream is broken down into small droplets. The finely atomized bisphenols melt forms a thin layer on the falling granules, melts into the solid surface and quickly solidifies on the relatively cool surface. Product granules of the desired size are formed by successive layering of the melt on the granules as they pass through the drum 110.

As the sprayed bisphenols solidifies on the undersize granules, considerable heat is released into the granulation drum. Cooling is provided by an inert gas stream being directed through the upper curtain of falling granules through gas distributors 115 passing through outlets 115a, thus providing an efficient method of heat exchange between the hot granules and the cooled gas stream. Efficient utilization of the cooling gas makes it practical to enclose the system with enclosure 120 and recirculate the inert gas.

The inert gaseous stream, in this instance nitrogen, is passed from the blower 140 through stream 141 to the gas distributor 115 inside the granulator drum 110. The gas exit header 116 with inlets 116a is used to pull the nitrogen from the drum to a dust removal means 150 through stream 142. Dust from the granulator 110 is separated from the nitrogen leaving the granulator in stream 142, for example, in a cyclone separator or bag house filters. The dust collected in stream 151 from the dust removal means 150 may be remelted and the melt may be recycled to the melt bisphenol feed stream 121 or the melt may be sent to a use point.

Preferably, the nitrogen stream 143 from the dust removal system is cooled using a gas cooling means 160. For example, the cooling means may be a conventional shell and tube-type heat exchanger using cooling tower water as the cooling medium. Preferably the nitrogen stream is cooled down to a temperature of from about 25° C. to abut 60° C. Then, the nitrogen in stream 144 can be recycled back to the granulator 110 after passing through the blower 140. A suitable and preferred cooling means 160 used in the present process is the one described in U.S. Pat. No. 4,813,982, entitled "Self Cleaning Heat Exchanger", filed on even date herewith, under the names of Andre Michael Huey and Arthur Ray Shirley, Jr., incorporated herein by reference.

The nitrogen flow rate is dependent upon the desired capacity, for example for a unit with a capacity of 5000 pounds per hour requires a flow rate of from about 6000 SCFM to about 8000 SCFM. The flow rate of nitrogen is small when compared to a prill system which is typically from 20,000 SCFM to 25,000 SCFM for a system with an equivalent capacity. The totally enclosed system of the present invention substantially minimizes yield loss, substantially reduces color of the product and substantially removes the potential for dust explosion.

In the process of the present invention relatively little dust is formed. It is believed that the dust levels generated in the present system range from about 10 mg/m$^3$ to about 50 mg/m$^3$. Any dust produced in the granulation drum which exits the drum with the gaseous stream can be separated from the gas and collected by conventional equipment known in the art, as aforementioned. In addition to the above collection process, it is preferred to remove as much dust from the gaseous stream within the granulation drum prior to the gaseous stream exiting the drum through the exhaust header 115. A suitable and preferred device used in the present process to capture dust particles within the granulator 110 is described in U.S. patent application Ser. No. 005,503, now abandoned, entitled "Dust Collection Assembly", filed of even date herewith, under the names of Andrew Michael Huey and Arthur Ray Shirley, Jr., incorporated herein by reference.

Granules in stream 133 discharge from the drum granulator 110 into a double-deck screen 170 for separating the product from oversize and undersize granules. The on size or product granules of bisphenols (shown as stream 171 in FIG. 3) are routed from the screen 170 to, for example, bulk storage, to a fluid bed cooler for further cooling, or to a desired use point. The oversize (stream 172) from the screen 170 may be remelted in a melter (not shown) and recycled or fed into the granulator 110 with the molten bisphenol feed stream 121, or conveyed to a desired use point. Optionally, the oversize may be ground for use as seed material. The undersize (stream 173) from the screen 170 is conveyed to a recycle hopper (not shown), where it is fed back into the granulation drum with seed material at a metered rate by a weight feeder. Optionally, the undersize may be fed into the melter for recycling or conveyed to another desired use point.

An important feature of the present invention is that the nozzle assemblies 20 are substantially surrounded by heating fluid in space 13 and thus the feed material in space 14 can be maintained in a molten state from the time the material leaves the space 14 through the tube 22, through the exit opening 30 and out into the falling granules. The steam heating fluid in space 13 is used to maintain the temperature of the melt. The bisphenol melt spray temperature is preferably from about 154° C. to about 160° C. The process or bead temperature inside the drum is preferably maintained at a temperature of from about 70° C. to about 138° C. and more preferably from about 123° C. to about 130° C.

As the sprayed bisphenols solidifies on the undersize granules, considerable heat is released into the granulation drum. Cooling is provided by the inert gas stream being directed through the upper curtain of falling granules through gas distributors, thus providing an efficient method of heat exchange between the hot granules and the cooled gas stream. The drum can be enclosed and the gas recycled.

Granules discharge from the drum granulator into a double-deck screen for separating the product from oversize and undersize granules. The onsize or product granules of bisphenols are routed from the screen to, for example, bulk storage, to a fluid bed cooler for further cooling, or to a desired use point. The oversize from the screen may be remelted in a melter and recycled or fed into the granulator with the molten bisphenol feed stream, or conveyed to a desired use point. Optionally, the oversize may be ground for use as seed material. The undersize from the screen is conveyed to a recycle hopper, where it is fed back into the granulation drum with seed material at a metered rate by a weigh feeder. Optionally, the undersize may be fed into the melter for recycling or conveyed to another desired use point.

What is claimed is:

1. A spray header and nozzle assembly for spraying molten bisphenol onto seed material of bisphenol within a granulation drum to produce bisphenol granules comprising:
   (a) a first elongated tubular member;
   (b) a second elongated tubular member being of a smaller diameter than the first tubular member and coaxially disposed within the first tubular member to form an annular space between the first and second tubular members;
   (c) a means for passing molten bisphenol through the second tubular member;
   (d) a means for passing a heating fluid means through the annular space;
   (e) a plurality of spray nozzle assemblies in fluid communication with the inside of the second tubular member for spraying molten bisphenol onto the seed bisphenol in a linear pattern, each individual nozzle assembly perpendicularly disposed to the axis of both tubular member and recessed into the annular space, each individual nozzle assembly rotated slightly off the horizontal to avoid overlapping spray streams, each individual nozzle assembly comprising:
      i. a means for spraying a finely atomized spray of bisphenol,
      ii. a first tube extending a predetermined distance beyond the circumference of the first tubular member, the first tube having a curved shoulder portion for allowing any particles of bisphenol on the surface of the shoulder portion to melt and drip off the shoulder portion without falling into the first tube whereby plugging of the nozzle assembly is prevented, and
      iii. a second tube of a smaller diameter than the first tube disposed within the first tube and recessed into the first tube, the second tube having a spray nozzle exit orifice and in fluid communication with the second tubular member, the second tube having a length substantially equal to the width of the annular space in cross section, whereby said heating fluid means substantially surrounds the first tube to maintain the molten bisphenol in a molten state as the molten bisphenol passes from the second tubular member through the second tube until the molten bisphenol exits through the spray nozzle exit orifice; and
   (f) said heating fluid means for melting any bisphenol particles which settle on the surface of the shoulder portion such that a buildup of bisphenol on said nozzle assemblies is prevented and for maintaining the molten bisphenol in a molten state as the molten bisphenol passes through the nozzle assemblies.

2. In a rotary granulation drum for producing bisphenol granules including a lifting flight for a bed of seed material of bisphenol fed therein, a curtain a falling seed bisphenol, a pan, a spray header and nozzles for spraying molten bisphenol onto the curtain of falling seed material, the improvement which comprises a spray header and nozzle assembly including:
   (a) a first elongated tubular member;
   (b) a second elongated tubular member being of a smaller diameter than the first tubular member and coaxially disposed within the first tubular member to form an annular space between the first and second tubular members;
   (c) a means for passing molten bisphenol through the second tubular member;
   (d) a means for passing a heating fluid means through the annular space;
   (e) a plurality of spray nozzle assemblies in fluid communication with the inside of the second tubular member for spraying molten bisphenol onto the seed bisphenol in a linear pattern, each individual nozzle assembly perpendicularly disposed to the axis of both tubular members and recessed into the annular space, each individual nozzle assembly rotated slightly off the horizontal to avoid overlapping spray streams, each individual nozzle assembly comprising:
      i. a means for spraying a finely atomized spray of bisphenol,
      ii. a first tube extending a predetermined distance beyond the circumference of the first tubular member, the first tube having a curved shoulder portion for allowing any particles of bisphenol on the surface of the shoulder portion to melt and drip off the shoulder portion without falling into the first tube whereby plugging of the nozzle assembly is prevented, and
      iii. a second tube of a smaller diameter than the first tube disposed within the first tube and recessed into the first tube, the second tube having a spray nozzle exit orifice and in fluid communication with the second tubular member, the second tube having a length substantially equal to the width of the annular space in cross section, whereby said heating fluid means substantially surrounds the first tube to maintain the molten bisphenol in a molten state as the molten bisphenol passes from the second tubular member through the second tube until the molten bisphenol exits through the spray nozzle exit orifice; and
   (f) said heating fluid means for melting any bisphenol particles which settle on the surface of the shoulder portion such that a buildup of bisphenol on said nozzle assemblies is prevented and for maintaining the molten bisphenol in a molten state as the molten bisphenol passes through the nozzle assemblies.

3. A process for spraying seed material with molten bisphenol within a granulation drum for producing bisphenol granules comprising:
   (a) forming a molten bisphenol;
   (b) passing the molten bisphenol through a spray header and nozzle assembly including a first elongated tubular member and a second elongated tubular member for passing molten bisphenol there through, said second tubular member being of a smaller diameter than the first tubular member and coaxially disposed within the first tubular member to form an annular space between the first and second tubular members;
(c) passing heating fluid through the annular space to maintain the molten bisphenol in a molten state as the molten bisphenol passes through the second tubular member;
(d) passing the molten bisphenol through a plurality of spray nozzle assemblies in fluid communication with the inside of the second tubular member; each individual nozzle assembly perpendicularly disposed to the axis of both tubular members and recessed into the annular space, each individual nozzle assembly including a first tube extending a predetermined distance beyond the circumference of the first tubular member, the first tube having a curved shoulder portion for allowing any particles of bisphenol on the surface of the shoulder portion to melt and drip off the shoulder portion without falling into the first tube and a second tube of the nozzle assemblies whereby plugging of the nozzle assemblies is prevented, each individual nozzle assembly including a second tube of a smaller diameter than the first tube disposed within the first tube and recessed into the first tube, the second tube having a length substantially equal to the width of the annular space in cross section, the second tube in fluid communication with the second tubular member;
(e) maintaining a heating fluid substantially surrounding the second tube at a temperature sufficient to maintain the molten bisphenol in a molten state as the molten bisphenol passes from the second tubular member through the second tube;
(f) spraying a finely atomized spray of bisphenol onto the seed bisphenol in a linear pattern and slightly off the horizontal to avoid overlapping spray streams; and
(g) shielding the spray nozzles to prevent plugging of the nozzles during spraying.

4. A process for producing bisphenol granules within a rotating granulation drum comprising:
(a) forming a bed of seed material of bisphenol in the drum;
(b) rotating the granulation drum;
(c) lifting the bed of seed bisphenol;
(d) dropping the seed bisphenol to form a falling curtain of seed bisphenol;
(f) forming a molten bisphenol;
(g) spraying finely atomized molten bisphenol onto the falling curtain of seed bisphenol with a plurality of spray nozzles;
(h) spraying the molten bisphenol at a linear pattern slightly off horizontal to avoid overlapping spray streams;
(i) maintaining a heating fluid at a temperature sufficient to maintain the molten bisphenol in a molten state; and
(j) shielding the spray nozzles to prevent plugging of the nozzles during spraying.

* * * * *